United States Patent
Seyffert et al.

(10) Patent No.: US 12,187,220 B2
(45) Date of Patent: Jan. 7, 2025

(54) METHOD FOR PRODUCING A BELT STRAP FOR A SAFETY BELT SYSTEM IN A VEHICLE, BELT STRAP, AND VEHICLE HAVING BELT STRAP

(71) Applicant: ZF AUTOMOTIVE GMBH, Alfdorf (DE)

(72) Inventors: Martin Seyffert, Pfullingen (DE); Oliver Gross, Schwäbisch Gmünd (DE); Karl Hudelmaier, Alfdorf (DE); Jochen Huber, Donzdorf (DE)

(73) Assignee: ZF AUTOMOTIVE GMBH, Alfdorf (DE)

( * ) Notice: Subject to any disclaimer, the term of this patent is extended or adjusted under 35 U.S.C. 154(b) by 608 days.

(21) Appl. No.: 17/774,356

(22) PCT Filed: Nov. 18, 2019

(86) PCT No.: PCT/EP2019/081598
§ 371 (c)(1),
(2) Date: May 4, 2022

(87) PCT Pub. No.: WO2020/104352
PCT Pub. Date: May 28, 2020

(65) Prior Publication Data
US 2022/0363217 A1  Nov. 17, 2022

(30) Foreign Application Priority Data
Nov. 21, 2018  (DE) ........... 10 2018 129 267.8

(51) Int. Cl.
*B60R 22/12* (2006.01)
*B60R 21/015* (2006.01)
(Continued)

(52) U.S. Cl.
CPC ........ *B60R 22/12* (2013.01); *B60R 21/01538* (2014.10); *B60R 21/01544* (2014.10);
(Continued)

(58) Field of Classification Search
CPC .............. B60R 22/12; B60R 21/01538; B60R 2022/485; B60R 22/48; B60R 21/01544; D03D 1/0005; D03D 15/54
See application file for complete search history.

(56) References Cited

U.S. PATENT DOCUMENTS 7,407,518 B2 *  8/2008  Bosman ............... D03D 1/0005
                                                      139/383 B
8,006,909 B2 *  8/2011  Swiler .................... B05D 5/06
                                                      235/494

(Continued)

FOREIGN PATENT DOCUMENTS

| CH | 613415 A5 | 9/1979 |
| EP | 3508385 A1 | 7/2019 |

(Continued)

OTHER PUBLICATIONS

PCT International Search Report for corresponding International Application Serial No. PCT/EP2019/081598, mailed Feb. 4, 2020, pp. 1-19.

*Primary Examiner* — Timothy Wilhelm
(74) *Attorney, Agent, or Firm* — Tarolli, Sundheim, Covell & Tummino LLP

(57) ABSTRACT

A method for manufacturing a webbing (20) for a seat belt system in a vehicle comprises the following steps of: weaving the webbing (20) using a first yarn (30) and a second yarn (32), the first yarn (30) and the second yarn (32) reflecting light in the spectrum invisible to humans with different intensity, wherein the first and second yarns (30, 32) form a pattern (36), and overdying the webbing (20) so that the webbing (20) reflects light in the spectral range (Continued)

visible to humans in such a way that it has a homogenous appearance for humans. Moreover, such a webbing (20) and a vehicle comprising such a webbing (20) are provided.

20 Claims, 2 Drawing Sheets

(51) Int. Cl.
*B60R 22/48* (2006.01)
*D03D 1/00* (2006.01)
*D03D 15/54* (2021.01)

(52) U.S. Cl.
CPC ............ *B60R 22/48* (2013.01); *D03D 1/0005* (2013.01); *D03D 15/54* (2021.01); *B60R 2022/485* (2013.01)

(56) References Cited

U.S. PATENT DOCUMENTS

| | | | |
|---|---|---|---|
| 9,347,155 B2 * | 5/2016 | Terashima | ............ G09F 3/0291 |
| 10,328,893 B2 * | 6/2019 | Shimazaki | ............ B60R 22/34 |
| 10,562,484 B2 * | 2/2020 | Helvoort | ............ D03D 11/02 |
| 10,864,826 B2 * | 12/2020 | Kuepper | ............ B60N 2/002 |
| 10,997,440 B2 * | 5/2021 | Ohno | ............ B60R 1/00 |
| 11,084,443 B2 * | 8/2021 | Hiroki | ............ B60R 21/01544 |
| 11,210,539 B2 * | 12/2021 | Ramaglia | ............ B60Q 3/242 |
| 11,833,993 B2 * | 12/2023 | Ramaglia | ............ B60R 22/48 |
| 2005/0263992 A1 * | 12/2005 | Matsuda | ............ G06V 20/593 |
| | | | 280/735 |
| 2007/0069514 A1 * | 3/2007 | Regoli | ............ B60R 22/12 |
| | | | 280/801.1 |
| 2007/0195990 A1 * | 8/2007 | Levy | ............ G06V 10/225 |
| | | | 340/457.1 |
| 2018/0326944 A1 * | 11/2018 | Cech | ............ G01S 11/00 |
| 2020/0023808 A1 * | 1/2020 | Terai | ............ D03D 15/283 |
| 2020/0055480 A1 * | 2/2020 | Herbert | ............ G06V 20/59 |
| 2021/0146878 A1 * | 5/2021 | Terai | ............ D03D 1/0005 |

FOREIGN PATENT DOCUMENTS

| | | | | | |
|---|---|---|---|---|---|
| GB | 2040327 A | * | 8/1980 | ............ | D03D 1/0005 |
| GB | 2413992 A | * | 11/2005 | ............ | B60R 22/12 |
| JP | H0418139 A | | 1/1992 | | |
| JP | 2009120115 A | | 6/2009 | | |
| JP | 2018133264 A | * | 8/2018 | | |
| WO | 2018/042536 A1 | | 3/2018 | | |
| WO | 2018/155085 A1 | | 8/2018 | | |

* cited by examiner

METHOD FOR PRODUCING A BELT STRAP FOR A SAFETY BELT SYSTEM IN A VEHICLE, BELT STRAP, AND VEHICLE HAVING BELT STRAP

RELATED APPLICATIONS

This application is a U.S. National Stage Application filed under 35 USC 371. claiming priority to Serial No. PCT/EP2019/081598, filed on 18 Nov. 2019; which claims priority from German Patent Application DE 10 2018 129 267.8, filed 21 November 2018, the entireties of which are hereby incorporated herein by reference.

TECHNICAL FIELD

The invention relates to a method for manufacturing a webbing for a seat belt system in a vehicle. Moreover, the invention relates to such webbing and to a vehicle comprising such webbing.

BACKGROUND

It is known from the state of the art to mark the webbing of seat belts so as to be able to detect the webbing and to determine the actual webbing extension more easily by means of a camera. For this purpose, the webbing is provided with markers, in particular in the form of a pattern.

In order to maintain a uniform appearance of the webbing, the markers are invisible to the human eye, i.e., the markers are made of a material that reflects the light in the spectral range visible to humans in the same way as the webbing itself. For wavelengths in the spectral range invisible to humans, the reflectance of the marker material differs from the material of the webbing, however, so that the pattern can be detected in this spectral range.

For manufacturing the marked webbing, the webbing is either formed in portions of the marker material corresponding to the pattern or is coated in portions with the marker material corresponding to the pattern.

These manufacturing methods are very elaborate, as the webbing must be marked with the pattern. At the same time, the marker material is very expensive or it is optically distinguishable from the webbing material in the visible range, resulting in the fact that no uniform color impression of the webbing can be guaranteed.

SUMMARY

It is the object of the invention to provide a method for manufacturing a webbing having an invisible marker which is cost-efficient and ensures a uniform color impression of the webbing. It is a further object of the invention to provide a webbing having an invisible marker which shows a uniform color impression in the visible range and which can be manufactured at low cost.

For achieving the object, a method for manufacturing a webbing for a seat belt system in a vehicle is provided, comprising the steps of:

forming the webbing using a first yarn and a second yarn, the first yarn and the second yarn reflecting light in the spectrum invisible to humans with different intensity, wherein the first and second yarns form a pattern, and overdying or coating the webbing so that the webbing reflects light in the spectral range visible to humans, independently of the yarn underneath, in such a way that it has a homogenous appearance for humans, i.e., the pattern is not visible to the human eye.

In accordance with the invention, light comprises both light visible to humans, i.e., electromagnetic radiation with a wavelength of about 380 nm to 750 nm, and light invisible to humans, i.e., electromagnetic radiation with a wavelength of less than 380 nm or more than 750 nm. The fact that the first yarn and the second yarn reflect light in the spectrum invisible to humans with different intensity means that the reflectance, i.e., the reflected portion of the incident light, at least at a specific wavelength differs from each other so clearly that the first yarn and the second yarns are distinguishable from each other based on their reflectance spectrums.

Preferably, the reflectance differs by a factor of at least 2, preferably of at least 5, specifically of at least 10.

The material by which the webbing is overdyed is opaque in the visible spectrum, while in the invisible spectrum it is partially transparent at least to the wavelengths in which the spectrum of the first yarn differs from the spectrum of the second yarn.

In contrast to the state of the art in which the webbing is marked with a pattern by means of a coating applied in portions and being different each time, during overdying or uniform coating no pattern is formed but the already present pattern formed by the yarn is covered.

In particular, in the case of overdying, the pattern formed by the yarn is retained so that it can be detected in the corresponding invisible spectral range. In this way, a large bandwidth of different yarns can be used for manufacturing the webbing, allowing the webbing to be manufactured at particularly low cost. Overdying in this case ensures that the webbing appears in a homogenous color to humans, i.e., the pattern is not recognizable to humans.

In particular, the first and second yarns can differ in the optically visible spectral range, i.e., without overdying the first yarn and the second yarn can be optically distinguished by humans.

In one embodiment, the first yarn and the second yarn can reflect light in the infrared spectral range with different intensity. The infrared spectral range comprises, according to the invention, electromagnetic radiation with a wavelength ranging from 750 nm to 1 mm.

In particular, the first yarn and the second yarn can reflect light in the near infrared spectral range with different intensity. In accordance with the invention, the near infrared spectral range comprises electromagnetic radiation with a wavelength ranging from 750 nm to 3 µm.

The infrared spectral range and, specifically, the near infrared spectral range are of particular advantage in this respect, as they represent a spectral range that can be detected by especially simple means and, thus, at low cost.

Moreover, the infrared spectral range and, specifically, the near infrared spectral range forms a substantial portion of the naturally occurring electromagnetic radiation so that, in this spectral range, high intensity of radiation is provided even if no external light source by which the webbing is illuminated is used.

Preferably, the reflectance differs by a factor of at least 2, preferably of at least 5, specifically of at least 10.

The first yarn and/or the second yarn can be a modified yarn whose reflectance in the infrared spectral range was modified by introducing and/or applying a material that absorbs or reflects light in the infrared spectral range particularly well. The term introducing in this context means that the material is introduced into the spinning material so that the modified yarn is produced directly during spinning. The term applying in this context means that the material is applied to a starting yarn, in particular by coating. In this way, the first yarn and/or the second yarn can be manufactured with a particular reflectance at low cost.

In addition, or as an alternative, the modified yarn can be formed by dying a starting yarn with the material.

Preferably, at least the portion of the webbing which is visible in the fastened state of the seat belt is overdyed. Thus, the exposed part of the webbing is ensured to show a homogenous color impression irrespective of whether the seat belt is fastened and the webbing is extended, for example, or the seat belt is not fastened and the webbing is wound on a belt retractor, for example.

In particular, the whole webbing can be overdyed to manufacture a webbing having a uniform appearance, resulting in facilitated further processing.

In one embodiment, the first yarn is spin-black yarn, that is, yarn of a black raw material. Such yarn is also known by the terms "spin-dyed" or "spun-dyed". Thus, the yarn has an electromagnetic spectrum with a low reflectance in the visible range, i.e., visible light is not or only poorly reflected by the yarn. This type of simple yarn is especially cost-effective.

Further, the second yarn may be raw white yarn, particularly non-dyed or dyed. In accordance with the invention, raw white yarn is a yarn that consists of a white material. Thus, the yarn has an electromagnetic spectrum with a high reflectance in the visible range, i.e., visible light is strongly reflected by the yarn. This type of simple yarn is especially cost-effective.

Accordingly, spin-black and raw white yarns are different not only in the optically visible spectral range but also in the non-visible spectral range, in particular in the infrared spectral range, so that spin-black and raw white yarns are distinguishable in the non-visible spectral range based on their reflection spectrums.

It is of advantage when the pattern has longitudinal stripes, i.e., stripes extending along the webbing, in particular in parallel to the edges of the webbing. This helps detect the pattern more easily, for example by a camera. Further, the actual webbing path can be determined more reliably in this way by means of the longitudinal stripes.

Preferably, the webbing is formed by weaving using warp threads and at least one weft thread. This manufacturing mode offers the advantage that the webbing can be fabricated in any length, with any pattern and at very low cost.

According to one embodiment, the weft thread consists of the first yarn and/or the second yarn so that no third yarn is required to manufacture the webbing. Depending on the chosen weaving method, the first yarn and/or the second yarn can be used with different yarn counts.

According to another embodiment, a part of the warp threads consists of the first yarn and another part of the warp threads consists of the second yarn. In this way, the pattern can be easily formed, in particular in the form of longitudinal stripes, by the two yarns.

Accordingly, the webbing may include groups of adjacent warp threads, each of the groups comprising 5 to 450, preferably 50 to 150, specifically 75 to 85 warp threads of the first or second yarn. Thus, longitudinal stripes which have a width corresponding to the number of the adjacent warp threads in the respective group are formed in the webbing.

According to the invention, for achieving the afore-mentioned object also a webbing is provided that is manufactured by means of the method according to the invention. Such a webbing has, in the visible spectral range, a uniform appearance with an invisible pattern and can be manufactured at low cost.

Further, according to the invention, for achieving the afore-mentioned object, also a vehicle comprising a webbing according to the invention, a camera and a light source is provided. In accordance with the invention, a camera is an optical sensor arranged to detect images by means of electromagnetic radiation. The light source emits light with a wavelength at which the reflectance of the first yarn and the second yarn is different in the invisible spectrum and at which the material by which the webbing is overdyed is at least partially transparent. The camera is arranged to detect light with said wavelength. In this way, using the camera the pattern of the webbing can be detected and using an appropriate control unit the webbing path of the webbing can be determined. This information can help increase, for example, the protective effect of the seat belt system part of which is constituted by the webbing.

BRIEF DESCRIPTION OF THE DRAWINGS

Further advantages and features will result from the following description and from the attached drawings, wherein.

DESCRIPTION

Figure 1:
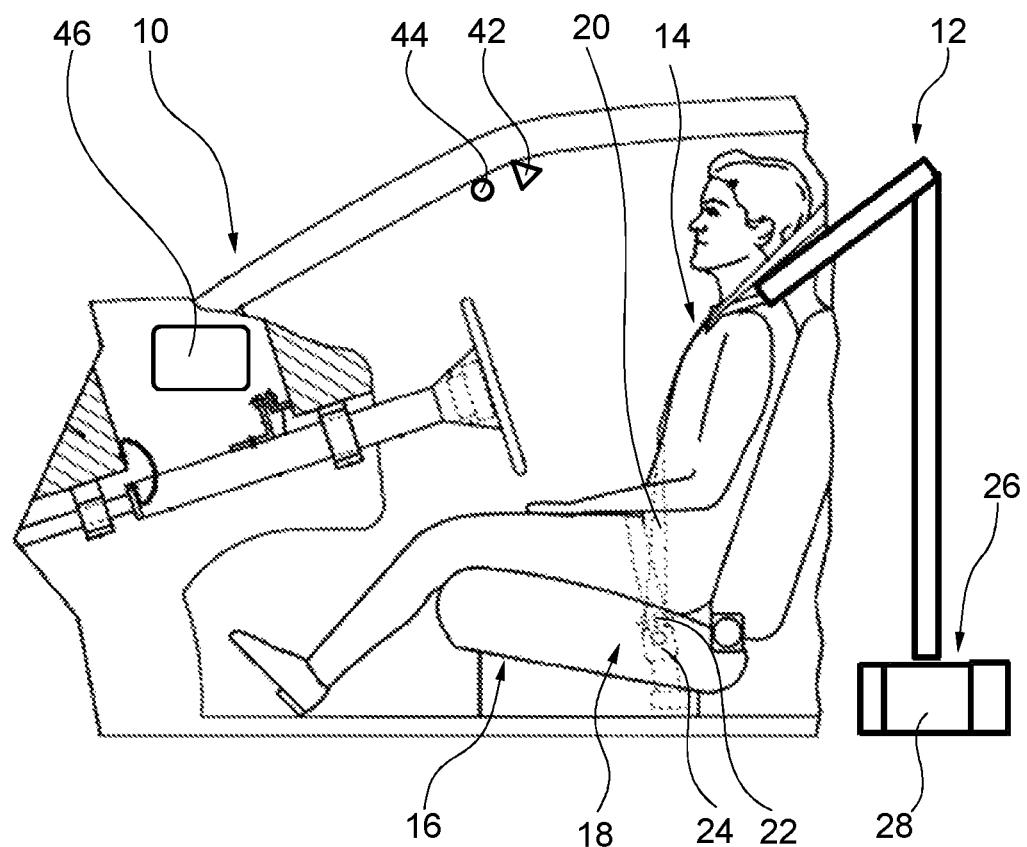
FIG. 1 shows, in a schematic representation, a vehicle according to the invention comprising a webbing according to the invention.

FIG. 1 illustrates the vehicle 10 comprising a seat belt system 12 for a vehicle occupant 14. The vehicle occupant 14 is seated in a vehicle seat 16 of the vehicle 10.

The vehicle 10 in this case is a passenger car. Alternatively, the vehicle 10 may be any vehicle, in particular an autonomously driving vehicle.

In an alternative embodiment, the seat belt system 12 may be provided for any seats in a vehicle 10 to protect the respective vehicle occupant 14 in a case of restraint, such as a crash.

The seat belt system 12 comprises a seat belt 18 having a webbing 20 and a plug-in tongue 22 as well as a belt buckle 24 in which the plug-in tongue 22 can engage. The webbing 20 serves for restraining the vehicle occupant 14 in the driver seat 16 when the belt buckle 24 is locked. The belt buckle 24 is locked by inserting the plug-in tongue 22 into and engaging it in the belt buckle 24.

In an alternative embodiment, the seat belt 18 may have any fastener and can be fastened in any way.

Furthermore, the seat belt system 12 comprises a belt retractor 26 having a belt reel 28 on which the webbing 20 is partially wound and which exerts tensile force upon the webbing 20. In this way, the webbing 20 and, thus, the seat belt 18 are accommodated to be extendable in the vehicle 10.

In an alternative embodiment, the webbing 20 can be provided to be extendable in any way or can be not extendable.

Figure 2:
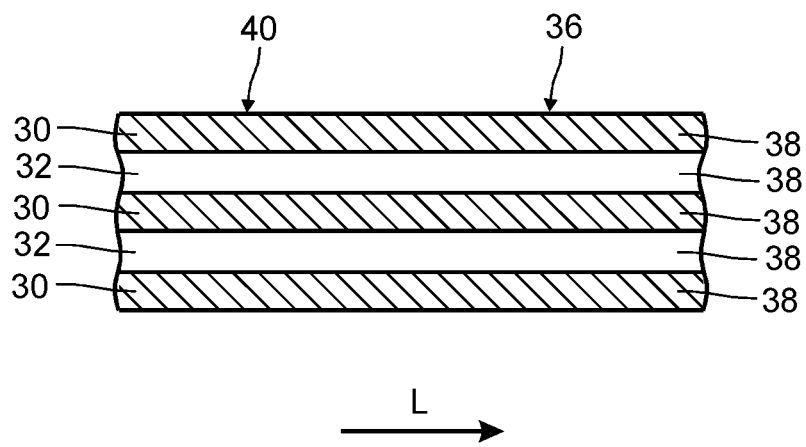
FIG. 2 shows, in a schematic representation, a portion of the webbing according to the invention of FIG. 1 in the visible spectral range after a first manufacturing step in accordance with a method of the invention.
Figure 3:
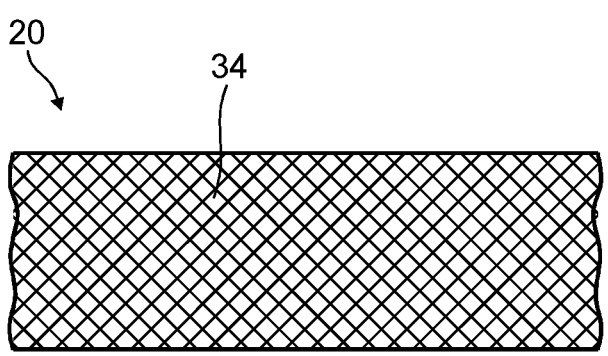
FIG. 3 shows, in a schematic representation, the portion of the webbing according to the invention of FIG. 2 in the visible spectral range after a second manufacturing step in accordance with the method of the invention.

The webbing 20 is woven of spin-black yarn 30 and raw white yarn 32 (see FIG. 2) and is overdyed with a coating 34 (see FIG. 3). Coating 34 in this context means not only a cover of the raw surface produced by applying a color layer using a doctor blade or similar techniques but also a cover which penetrates at least partially the raw material by means of dying.

As an alternative to weaving, the webbing 20 can be formed in any way.

The spin-black yarn 30 and the raw white yarn 32 form a pattern 36 of longitudinal stripes 38 extending in parallel to the longitudinal extension L of the webbing 20.

The longitudinal extension L of the webbing 20 is the direction in which the webbing 20 is wound up and extended, respectively.

As illustrated in FIG. 2, the webbing 20 has three longitudinal stripes 38 of spin-black yarn 30 and two longitudinal stripes 38 of raw white yarn 32, each extending in parallel to the longitudinal extension L and being arranged alternately as well as adjacent to each other and having the same width in the direction of the longitudinal extension L.

In an alternative embodiment, the pattern 36 can have substantially any design. In particular, the webbing 20 can have any number of longitudinal stripes 38 of spin-black yarn 30 and any number of longitudinal stripes 38 of raw white yarn 32 each having any width.

Each of the longitudinal stripes 38 is made of 80 warp threads.

Alternatively, each of the longitudinal stripes 38 can be made of 5 to 450, preferably 50 to 150, specifically 75 to 85 warp threads.

The weft thread with which the warp threads are interwoven consists of spin-black yarn 30. In addition, or as an alternative, the warp thread may consist of raw white yarn 32. Furthermore, the weft threads can be interwoven using plural weft threads, wherein each weft thread can be formed of spin-black yarn 30 and/or raw white yarn 32.

The materials of which the spin-black yarn 30 and the raw white yarn 32 are made reflect in the near infrared range, i.e., light with a wavelength ranging from 750 nm to 3 µm, with different intensity.

In addition, or as an alternative, the materials of which each of the spin-black yarn 30 and the raw white yarn 32 is made can reflect light in other spectral ranges invisible to humans with different intensity, such as in the UV range, i.e., light with a wavelength ranging from 10 nm to 380 nm, or in the IR-A range, i.e., light with a wavelength ranging from 780 nm to 1400 nm.

In an alternative embodiment, instead of spin-black yarn 30 and raw white yarn 32, any two types of yarn can be used which reflect light in the spectral range invisible to humans with different intensity.

For example, at least one of the yarns 30, 32 may be a modified yarn the reflectance of which in the infrared spectral range was modified using a material which absorbs or reflects light in the infrared spectral range particularly well.

In particular, the spin-black yarn 30 and/or the raw white yarn 32 can be dyed as long as the yarns 30, 32 continue reflecting light in the spectral range invisible to humans with different intensity.

In addition, or as an alternative, the weft thread can be formed of a third yarn which is different from the spin-black yarn 30 and the raw white yarn 32.

The coating 34 covers the whole surface of the webbing 20 and is opaque so that the pattern 36 underneath is not perceptible to the human eye and the webbing 20 for humans has a uniform color impression.

In the present embodiment, the coating 34 is black. Alternatively, the webbing 20 may be overdyed in any color, i.e., the coating 34 can have any color.

The coating 34 is transparent to light that is reflected by the spin-black yarn 30 and by the raw white yarn 32 in the spectral range invisible to humans with different intensity. In the present embodiment, this spectral range is the near infrared range. If the light reflected by the spin-black yarn 30 and by the raw white yarn 32 in the spectral range invisible to humans with different intensity is located in a different spectral range, a coating 34 is used, as a matter of course, which is transparent in the respective spectral range.

For manufacturing the webbing 20, first a ribbon 40 (see FIG. 2) having the pattern 36 is woven out of the spin-black yarn 30 and the raw white yarn 32.

In a subsequent step, the ribbon 40 is overdyed with the coating 34 (see FIG. 3).

The vehicle 10 further comprises a camera 42 and a light source 44 each of which is aligned so that they can detect and, respectively, illuminate at least the torso and/or the waist of the vehicle occupant 14 over which the webbing 20 extends when the seat belt 18 is fastened.

The camera 42 is a camera configured to detect light in the near infrared range.

The light source 44 is a light source configured to emit light in the near infrared range.

This means that the camera 42 and the light source 44 are configured to detect and, resp., to emit light in the spectral range invisible to humans in which the spin-black yarn 30 and the raw white yarn 32 reflect light with different intensity.

If the light reflected by the spin-black yarn 30 and by the raw white yarn 32 in the spectral range invisible to humans with different intensity is located in a different spectral range, a camera 42 and a light source 44 are used which can detect and, respectively, emit light in the corresponding spectral range.

As a matter of course, the camera 42 and/or the light source 44 can additionally detect and, resp., emit light in a different spectral range.

In particular, the camera 42 may be a camera that is provided in the vehicle 10 for further functions, such as an interior camera sensing the vehicle interior.

The camera 42 and the light source 44 are connected to a control unit 46 of the seat belt system 12 for signal transmission.

The control unit 46 in the present case is integrated in the on-board computer of the vehicle. In an alternative embodiment, the control unit 34 of the seat belt system 12 can be provided separately, wherein it is preferably connected to the on-board computer of the vehicle 10 for signal transmission.

The control unit 46 is arranged to control the camera 42 and the light source 44 as well as to detect the pattern 36 and, based on the latter, to determine the webbing path of the webbing 20 in the known way.

In the spectral range visible to humans, the webbing 20 has, due to the coating 34, a homogenous appearance (see FIG. 3) in which the pattern 36 is not recognizable.

Figure 4:
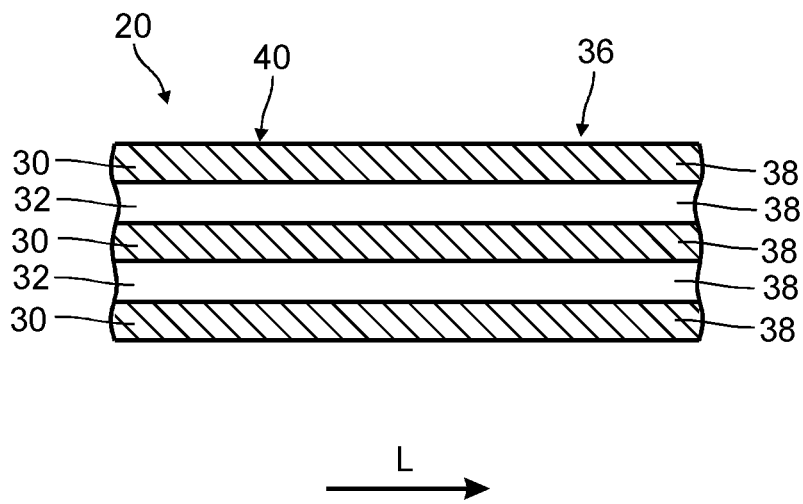
FIG. 4 shows, in a schematic representation, the portion of the webbing according to the invention of FIG. 3 in an invisible spectral range.

In the near infrared range, the coating 34 is transparent and the longitudinal stripes 38 of spin-black yarn 30 and the longitudinal stripes 38 of raw white yarn 32 reflect the infrared light with different intensity so that the pattern 36 is visible in this spectral range (see FIG. 4).

Thus, the pattern 36 can be detected by the camera 42 in this spectral range.

The light source 44 ensures that a sufficiently high light flux in this spectral range is incident on the ribbon 40 to attain a contrast between the longitudinal stripes 38 of spin-black yarn 30 and the longitudinal stripes 38 of raw white yarn 32, the contrast ensuring reliable detection of the pattern 36.

Based on the pattern 36 as well as the alignment and the extension thereof, the webbing path of the webbing 20 can be determined by the control unit 46 in a known way.

In this way, a webbing 20 having a uniform appearance and a pattern invisible to the human eye is provided.

Using the afore-described method, the webbing 20 can further be manufactured at particularly low cost.

The invention is not limited to the shown embodiment. In particular, individual features of one embodiment can be combined with any features of other embodiments, especially irrespective of the other features of the respective embodiments.

The invention claimed is:

1. A method for manufacturing a webbing (20) for a seat belt system (12) in a vehicle (10), comprising the steps of:
    a) forming the webbing (20) using a first yarn (30) and a second yarn (32), the first yarn (30) and the second yarn (32) reflecting light in the spectrum invisible to humans with different intensity, wherein the first and second yarns (30, 32) form a pattern (36), and
    b) overdying at least the portion of the webbing (20) that includes the pattern (36) with a material (34) that is opaque in the spectral range visible to humans so that the pattern (36) under the material (34) is invisible to humans and the webbing (20) has a homogenous appearance to humans, the material (34) being at least partially transparent in the spectrum invisible to humans, each overdyed portion of the webbing (20) being covered and at least partially dyed by the material (34).

2. The method according to claim 1, wherein the first yarn (30) and the second yarn (32) reflect light in the infrared spectral range with different intensity.

3. The method according to claim 2, wherein the first yarn (30) and/or the second yarn (32) is/are a modified yarn the reflectance of which in the infrared spectral range was modified by introducing, applying and/or dying with a material.

4. The method according to claim 1, wherein the first yarn (30) is spin-black yarn (30).

5. The method according to claim 1, wherein the second yarn (32) is raw white yarn (32).

6. The method according to claim 1, wherein the pattern (36) has longitudinal stripes.

7. The method according to claim 1, wherein the webbing (20) is formed by weaving using warp threads and at least one weft thread.

8. The method according to claim 7, wherein the weft thread is made of the first yarn and/or the second yarn (30, 32).

9. The method according to claim 7, wherein a part of the warp threads is made of the first yarn (30) and another part of the warp threads is made of the second yarn (32).

10. The method according to claim 9, wherein the webbing (20) includes groups of adjacent warp threads, each of the groups comprising 5 to 450 warp threads of the first or second yarn (30,32).

11. The method according to claim 9, wherein the webbing (20) includes groups of adjacent warp threads, each of the groups comprising 50 to 150 warp threads of the first or second yarn (30, 32).

12. The method according to claim 9, wherein the webbing (20) includes groups of adjacent warp threads, each of the groups comprising 75 to 85 warp threads of the first or second yarn (30,32).

13. A webbing (20) manufactured according to the method as set forth in claim 1.

14. A vehicle (10) comprising a webbing (20) according to claim 13, a camera (42) and a light source (44).

15. The method according to claim 1, wherein the first yarn (30) and the second yarn (32) reflect light in the near infrared spectral range with different intensity.

16. The method according to claim 1, wherein in the spectrum invisible to humans, the material (34) is partially transparent at least to wavelengths in which the reflectance spectrum of the first yarn (30) differs from the reflectance spectrum of the second yarn (32).

17. The method according to claim 1, wherein the material (34) is transparent to the light that is reflected by the first yarn (30) and by the second yarn (32) in the spectral range invisible to humans with different intensity.

18. The method according to claim 1, wherein an entirety of the formed webbing (20) is overdyed so that the material (34) covers the entirety of the formed webbing (20), each portion of the webbing (20) covered by the material (34) being at least partially dyed by the material (34).

19. The method according to claim 1, wherein the yarns (30, 32) of each overdyed portion of the formed webbing (20) are at least partially dyed via the penetration of the material (34) into the yarns (30, 32).

20. The method according to claim 1, wherein the pattern (36) forms an optical signifier that is detectable via a sensor, the optical signifier being undetectable to humans as a result of the optical signifier being covered and at least partially dyed by the material (34) during the overdying step.

* * * * *